United States Patent [19]

Menden

[11] 4,418,371

[45] Nov. 29, 1983

[54] ROLLING BIAS SPRING

[75] Inventor: Thomas J. Menden, Kenosha, Wis.

[73] Assignee: Teletype Corporation, Skokie, Ill.

[21] Appl. No.: 323,169

[22] Filed: Nov. 20, 1981

[51] Int. Cl.³ .......................... G11B 21/08; G11B 5/56
[52] U.S. Cl. .................................... 360/106; 360/109; 74/89.2
[58] Field of Search ................................ 360/104–106, 360/109; 74/89.2, 89.21, 89.22, 37

[56] References Cited

U.S. PATENT DOCUMENTS

| | | | |
|---|---|---|---|
| 2,965,886 | 12/1960 | Mitchell | 360/104 |
| 4,170,146 | 10/1979 | Owens | 74/89.2 |
| 4,198,871 | 4/1980 | Dunn et al. | 74/37 |
| 4,263,632 | 4/1981 | Burke, Jr. et al. | 360/106 |

FOREIGN PATENT DOCUMENTS 1079853  4/1960  Fed. Rep. of Germany ...... 360/106

OTHER PUBLICATIONS

IBM/TDB, vol. 19, No. 9, Feb. 1977, p. 3563, "Magnetic Slot Reader", by W. Frost.
Electronic Design, Oct. 25, 1980, pp. 103–108, "Novel Minifloppy Drive . . . ", by D. Cribbs.

Primary Examiner—John H. Wolff
Attorney, Agent, or Firm—A. A. Tirva; J. C. Albrecht

[57] ABSTRACT

A linear positioning device having a carriage slidably mounted on a guide rail incorporates a rolling bias spring located in a movable pocket formed by the carriage and the guide rod. The spring is formed with a flexible band material in a loop which is affixed to the carriage and is arranged to roll along the guide rod while exerting a force separating the carriage and the guide rod.

8 Claims, 6 Drawing Figures

FIG. 3a
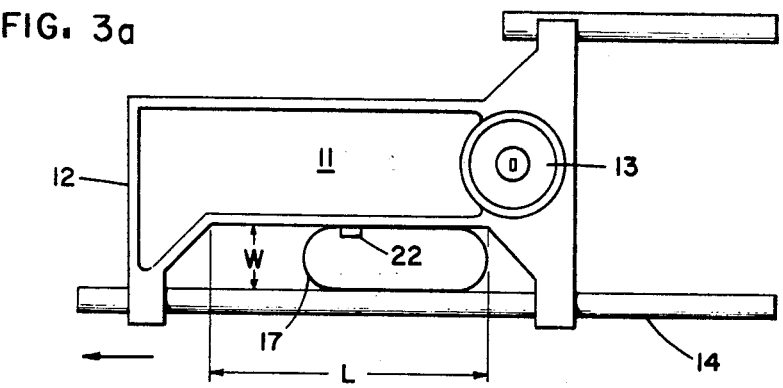
FIG. 3b
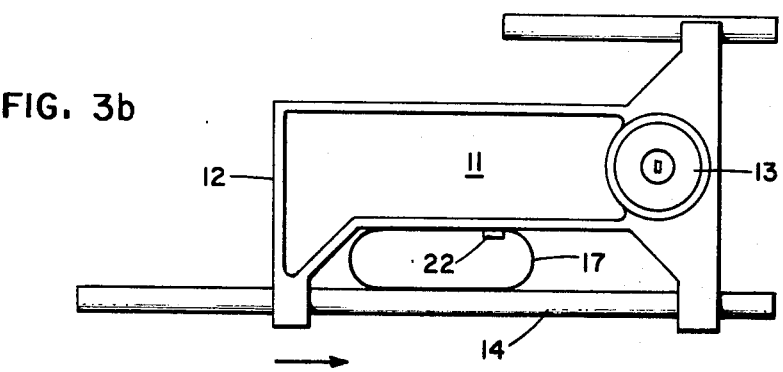
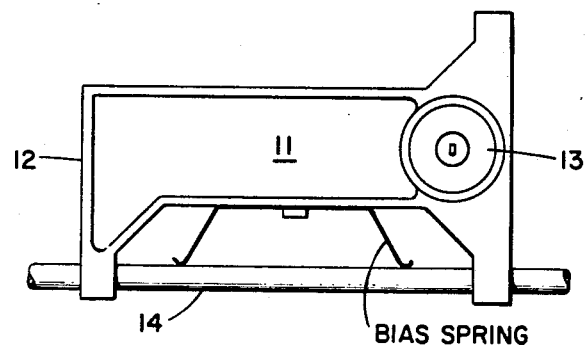
FIG. 4      PRIOR ART

ROLLING BIAS SPRING

DESCRIPTION

1. Technical Field

This invention relates to vibration dampening devices, and more particularly, to an improved bias spring for dampening vibrations of a carriage supporting a read/write head.

2. Background Art

Rigid and flexible magnetic disk drives utilizing read/write head positioning mechanisms which convert rotary motion of a stepping motor to linear motion of a carriage supporting a read/write head are well known and are disclosed, for example, in U.S. Pat. No. 4,170,146 issued to W. M. Owens and in an article by D. F. Cribbs entitled, "Novel Mini-floppy Drive Doubles Track Density" published in Electronic Design, Oct. 25, 1980 issue, pp. 103-108. There are various kinds of motion conversion mechanisms for the disk drives, for example, a flexible band, a lead screw or a cam type converter may be utilized. Most of the linear positioning devices in use today however, have one thing in common; namely, the guiding mechanism for the carriage is comprised of two or more linear bearings, mounted in the frame of the carriage, through which passes a round precision guide rod. The guide rod is positioned close to the radial center line of a rotating magnetic disk. This arrangement permits accurate positioning of the read/write head, and the relatively tight tolerances between the linear bearings and the precision guide rod ensure that there is virtually no radial movement between the bearings and the guide rod, and thus in turn, there is virtually no vibration and no acoustical noise.

Introduction of the low cost 5.25" mini-floppy disk drives required, among other things, less expensive read/write head positioning mechanisms. Since the linear bearings and the precision guide rods are relatively expensive items to manufacture and to assemble, one solution which has become commonly accepted in the industry, is to eliminate the bearings, relax the tolerances on the guide rod and pass the rod through two or more guide holes located in the frame of the carriage. This cost reduction approach, however, tends to introduce undesirable play between the carriage and the guide rod. To counteract this play, a bias spring is generally added to the positioning mechanism so as to exert a force between the carriage and the guide rod. The spring is placed in a movable pocket formed by the carriage and the guide rod and is affixed to the carriage allowing one or more portions of the spring to slide on the guide rod. While addition of the sliding bias spring solves the immediate problem of eliminating the play and the resulting undesirable vibration and noise, portions of the bias spring which slide along the guide rod introduce additional frictional forces which increase the load on the stepping motor and cause uneven movement of the carriage. Additionally, the portions of the bias spring sliding on the guide rod in time cause sufficient wear of the rod so as to even more increase the play between the carriage and the guide rod.

DISCLOSURE OF THE INVENTION

In accordance with the present invention, I provide a bias spring which is formed of a flexible metal band into a continuous loop and is positioned in a movable pocket between a guide rod and a carriage which is slidably mounted on the guide rod. The spring is affixed to the carriage and "rolls" on the guide rod along with movement of the carriage while exerting a separating force between the carriage and the guide rod.

THE DRAWING

FIGS. 3a and 3b are detailed schematic views illustrating the operation of the "rolling" bias spring.

FIG. 4 illustrates a typical prior art sliding bias spring.

DETAILED DESCRIPTION

Figure 1:
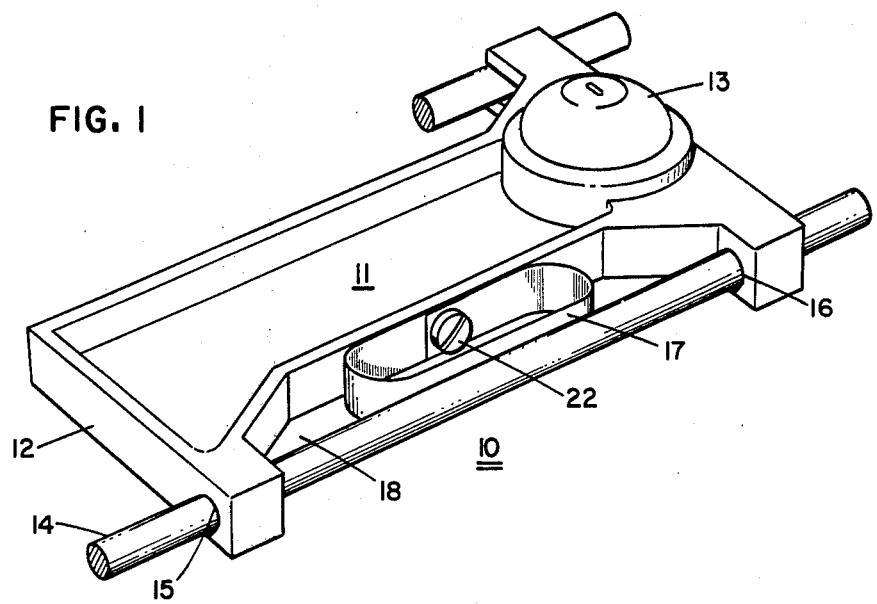
FIG. 1 is a partial perspective view of a disk drive linear positioning mechanism having a "rolling" bias spring.

FIG. 1 shows a partial view of a flexible disk drive linear positioning mechanism 10 which includes a carriage 11 having a frame 12 molded from a glass filled polycarbon material. The carriage 11 supports a magnetic read/write head 13 and is slidably mounted on a guide rod 14 which passes through guide holes 15 and 16 located in the frame 12 of the carriage 11. The holes 15 and 16 are molded in the frame 12 and the tolerances on their respective diameters are held to within 0.001". The guide rod 14 is made from cold rolled steel and the tolerance on its diameter is held to within 0.0005".

To reduce the play between the guide rod 14 and the guide holes 15 and 16, a rolling bias spring 17 is positioned in a movable pocket 18 formed by a portion of the frame 12 and the guide rod 14. The spring 17 exerts a force which acts against the carriage 11 and the guide rod 14 pushing them apart, and thus substantially eliminates any radial movement between the guide holes 15 and 16 and the guide rod 14.

Figure 2A:
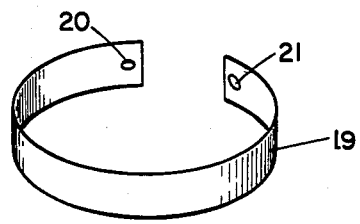
FIG. 2a is a perspective view illustrating construction of the "rolling" bias spring.

As shown in FIG. 2a, the bias spring 17 is formed into a loop with a flexible band 19, made of a blue clock spring steel material, by first drilling or punching holes 20 and 21 through the two ends of the band 19 and then overlapping the two ends and passing a screw 22 through the holes 20 and 21. The screw 22 holds the loop together and is used to firmly affix the spring 17 to the frame 12 at approximately the midpoint of the pocket 18.

Figure 2B:
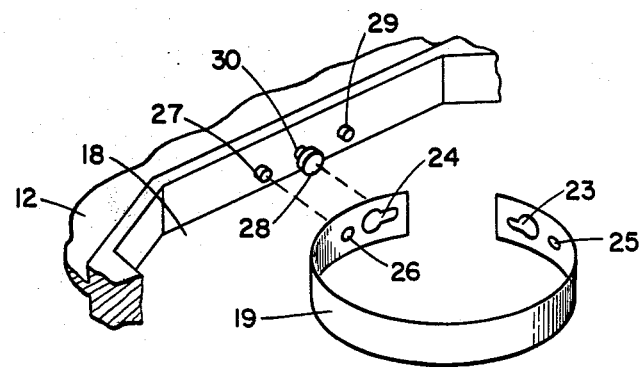
FIG. 2b is a perspective view illustrating an alternate method of construction of the "rolling" bias spring.

An alternate method of forming the band 19 into a loop and attaching it to frame 12 is shown in FIG. 2b. As shown in FIG. 2b, keyhole shaped openings 23 and 24 and circular openings 25 and 26 are made respectively in each of the ends of the flexible band 19. The frame 12 has three substantially cylindrical projections 27, 28 and 29 extending from its surface into the pocket 18. Projection 28, located at approximately the midpoint of the pocket 18, has at its base a circumferential channel 30 having a width sufficient to accommodate twice the thickness of the flexible band 19.

To form a loop and to affix it to the frame 12, a portion of the keyhole shaped opening 23 is made sufficiently large to fit over projection 28 allowing the band 19 to be pushed against the frame. The band 19 is then pulled forward so that the narrow portion of the opening 23 enters the circumferential channel 30. The band is pulled forward until projection 29 is accommodated by the opening 25 anchoring the ends of the band 19 in place. A similar procedure is repeated to attach the other end of the band 19 to the frame 12 except that the other end is bent over so that opening 26 can accommodate projection 27. Thus, both ends of the band 19 are affixed to the frame 12 and the ends overlap forming a continuous loop.

It was determined experimentally that a force of approximately two ounces applied between the carriage 11 and the guide rail 14 is sufficient to bias the carriage 11 to substantially eliminate the play between the guide rod 14 and the guide holes 15 and 16. To develop such a force with the spring 17, made of blue clock steel material in the configuration as shown in FIG. 1, it was determined experimentally that the band thickness required is approximately 0.002".

The flexible band 19 has to be of sufficient length so that when it is formed into a loop, is inserted into the pocket 18 and is affixed by the screw 22 to the frame 12, as shown in FIG. 1, portions of the band 19 on each side of the screw 22 are of sufficient length to permit the carriage 11 maximum required travel in either direction along the guide rod 14. The travel of the carriage 11 and positions of the spring 17 are illustrated in FIGS. 3a and 3b. Accordingly, dimension L, as shown in FIG. 3a, of the pocket 18 has to be of sufficient length to accommodate the bias spring 17 and to permit maximum required travel of the carriage 11 in either direction. Dimension W of the pocket 18 has to be of sufficient width so as not to cause too sharp a bend in the band 19 which could result in permanent deformation of the spring material.

In case where the flexible band 19 is formed into a loop and affixed to the frame 12 per the alternate method shown in FIG. 2b, band 19 has to be sufficiently long on each side of projections 27 and 29 to permit the carriage 11 maximum required travel in either direction on the guide rod 14.

In operation, movement of the carriage 11 along the guide rod 14 causes one end of the bias spring 17 to wind up while the other end unwinds. The energy required to wind up the spring 17 at the one end is substantially counter-balanced by the energy being released by the other end which is unwinding. Movement of the spring 17 along the guide rail 14 resembles the rolling motion of a cylindrical object on a flat surface, and there does not appear to be any substantial slidable friction between the spring 17 and the guide rod 14 which can generate frictional forces to oppose movement of the carriage 11.

What is claimed is:

1. Linear positioning apparatus for a read/write head comprising:
    a carriage having a frame for supporting the read/write head,
    the carriage slidably mounted on one or more guide rods the frame and said at least one guide rod forming a movable pocket therebetween,
    a bias spring formed in a loop positioned in said pocket, and
    means for affixing said spring to the frame whereby the spring rolls along the guide rod together with the movement of the carriage while exerting a separating force between the carriage and said guide rod.

2. Apparatus in accordance with claim 1 wherein the loop comprises a flexible metal band.

3. Apparatus in accordance with claim 2 wherein each end of the flexible band has an aperture therethrough.

4. Apparatus in accordance with claim 3 wherein the loop is formed by overlapping the two ends of the flexible band so that the two apertures are aligned for accommodating therethrough the spring affixing means.

5. Apparatus in accordance with claim 4 wherein the spring affixing means holds the two ends of the band together and affixes the spring to the frame at substantially the midpoint thereof.

6. Apparatus in accordance with claim 5 wherein the length of the flexible band on each side of the affixing means is greater than the maximum permissible travel of the carriage in either direction.

7. Apparatus in accordance with claim 6 wherein the flexible band material is blue clock spring steel.

8. Apparatus in accordance with claim 7 wherein the affixing means comprises a screw.

* * * * *